No. 747,600. PATENTED DEC. 22, 1903.
D. D. FRANKLIN.
METHOD OF FIXING COMPOUND LIQUIDS.
APPLICATION FILED DEC. 15, 1902.
NO MODEL.
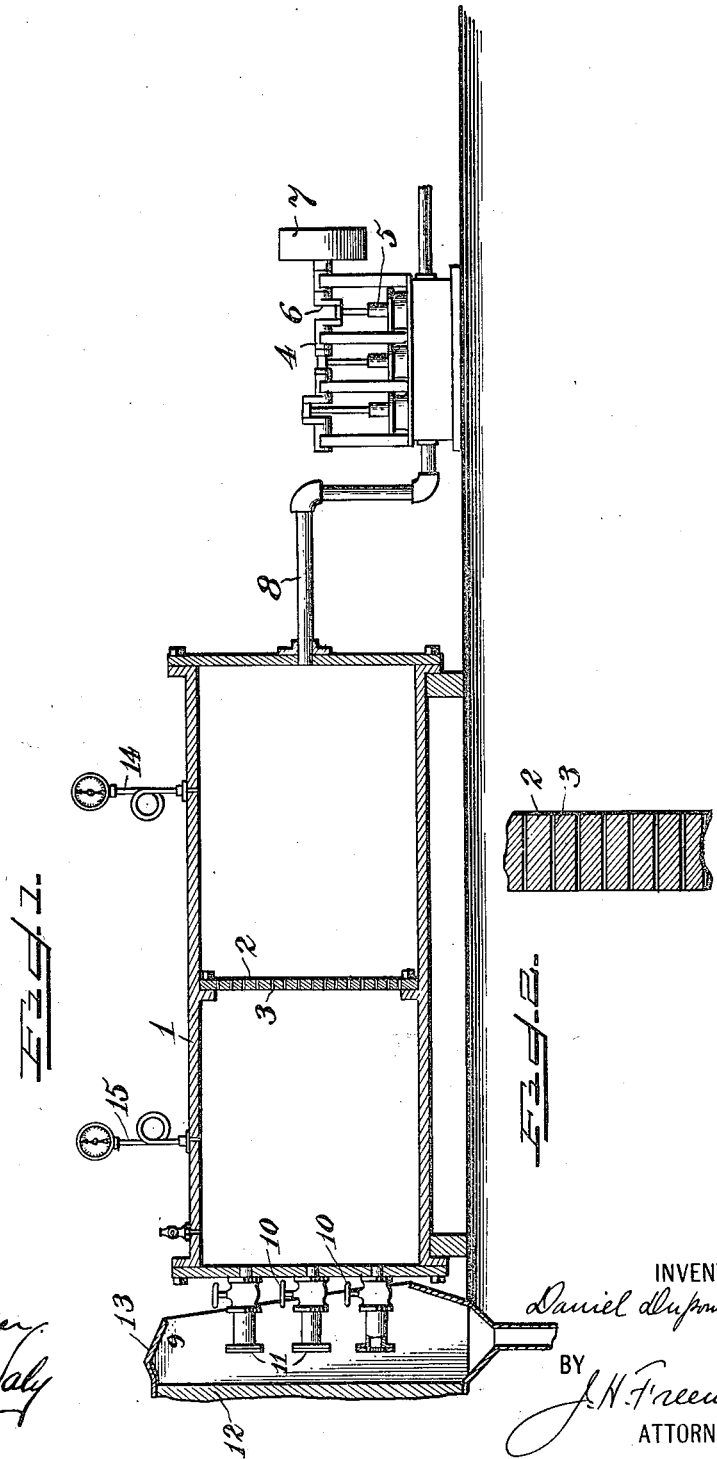
WITNESSES:
INVENTOR
Daniel duPont Franklin
BY
J. H. Freeman
ATTORNEY No. 747,600. Patented December 22, 1903.

UNITED STATES PATENT OFFICE.

DANIEL DUPONT FRANKLIN, OF NEW YORK, N. Y.

METHOD OF FIXING COMPOUND LIQUIDS.

SPECIFICATION forming part of Letters Patent No. 747,600, dated December 22, 1903.

Application filed December 15, 1902. Serial No. 135,339. (No specimens.)

*To all whom it may concern:*

Be it known that I, DANIEL DUPONT FRANKLIN, a citizen of the Republic of France, and a resident of the city, county, and State of New York, have invented a new and Improved Method of Fixing Compound Liquids, of which the following is a specification.

My invention relates to an improvement in a method of fixing compound liquids, and more particularly to a process for treating milk to preserve it and prevent it from separating into its constituent elements.

It is known that when new milk has been treated by forcing it under great pressure through fine holes—say about one-tenth of a millimeter in diameter in a rigid plate or diaphragm—it will not so readily separate into its elements as when it has not been so treated, the theory being that by reason of the treatment the globules of the various substances of which the milk is composed are crushed or laminated and made to adhere to each other more firmly. In accordance with this prior process of treating milk the streams of the milk are permitted to issue from the fine openings directly into the open air or into a chamber in which the pressure is maintained at substantially that of the atmosphere. While milk subjected to this process will not separate as readily as when it has not been so treated, it will not retain its original condition indefinitely.

My invention has for an object to so improve the prior process that the milk will retain its original condition indefinitely when properly sealed.

One feature of my invention is based on the discovery that much of the beneficial effect of the prior process is lost by reason of the fact that the great pressure under which the milk is driven through the fine perforations is suddenly released when the milk issues from the perforations, the molecules of the various substances being permitted thereby to partially regain their former condition. In accordance with this feature of my invention, therefore, the milk is subjected to a crushing pressure—as, say, two hundred atmospheres or more—and it is then passed through a set of minute openings without greatly reducing the pressure. In accordance with the best procedure the milk is passed through successive sets of minute openings, the pressure being permitted to drop step by step until it is finally reduced to that of the atmosphere.

In accordance with another feature of my invention I further laminate or crush the globules of which the milk is composed by subjecting the same to an impact under a high velocity—as, say, two hundred feet per second. In accordance with the best practice of this feature of the invention the streams of milk issuing from a set of fine perforations are directed against a rigid surface. To secure the best results, the milk is treated in accordance with both features of my process—that is to say, the milk is first subjected to a crushing pressure, then it is passed through one or more sets of minute openings without greatly reducing the pressure, and finally it is discharged still under great pressure through a set of fine openings against a rigid impact surface.

In order that my process may be more fully understood, I have illustrated in the accompanying drawings an apparatus adapted to carry the same in its best form into effect.

Of the drawings, Figure 1 is a longitudinal sectional view of the apparatus, and Fig. 2 is a sectional view of a detail.

As shown, this apparatus consists of a heavy cylinder 1, constructed with sufficient strength to sustain an internal pressure of from two hundred to two hundred and fifty atmospheres. At an intermediate point in this cylinder is arranged a transverse plate or diaphragm 2, which separates the opposite ends of the cylinder. This plate is provided with a multiplicity of minute perforations, which should be about one-tenth of a millimeter in diameter. In Fig. 2 a detail of the diaphragm 2 is shown on a much larger scale to represent more accurately the relative proportions of the perforations 3 in the plate. It will be understood, however, that even in this view the diameter of the perforations is much exaggerated. 4 is a suitable pump for supplying the milk to the receptacle 1 and to create the desired pressure therein. Obviously any suitable form of pump can be used, that shown consisting of a number of plungers 5, which are operated by the cranks formed at various angles on the crank-shaft 6, which receives motion from a driving-pulley 7. This form of pump is preferred, as it gives a more steady flow to the fluid, and consequently a more uniform pressure. The pump is connected to one end of the cylinder 1 by a pipe 8. The opposite end of the cylinder is provided with a number of discharge-pipes 9, each of which is preferably provided with a valve 10, whereby the number of discharge-pipes which are in operation may be varied. Each of these discharge-pipes is closed at its outer end by a plate or diaphragm 11, which is provided with a series of fine perforations similar to the perforations 3 of the diaphragm 2.

In order that the second feature of my process may be carried out by this apparatus, a rigid wall, preferably consisting of a tempered steel plate, is arranged a short distance in front of the discharge-pipes, a suitable hood or collecting-chamber 13 being provided around the edge of the plate 12 to collect the milk discharged therefrom. The cylinder 1 is preferably provided on opposite sides of the diaphragm 2 with suitable pressure-gages 14 and 15. To carry out my process by this apparatus, the valves 10 being closed and the cylinder 1 being filled with milk, the pump is started and the pressure in the cylinder is brought up to the desired amount—say two hundred and fifty atmospheres. One of the valves 10 is then opened, the pump being kept in operation, and, if necessary, a second and third valve 10 is opened until the pressure on the discharge side of the diaphragm 2 is reduced to such amount as to cause the milk to flow through the fine perforations 3 in the plate 2 at the desired rate. Preferably the valves 10 are opened until the pressure on the discharge side of the diaphragm 2 is reduced to, say, two hundred atmospheres. This pressure will cause the milk to be discharged through the perforations of the plate 11 at a very high velocity, about three hundred feet per second, and as the streams come in contact with the surface of the plate 12 the molecules will be again subjected to a great pressure due to the great impact thereof.

The passage of the milk through the perforations 3 will crush the globules of the milk or cause them to adhere, and as the pressure on the discharge side of the plate is not greatly reduced the molecules are retained in their crushed condition. The detrimental effect, if any, of discharging the milk under the reduced pressure from the perforations in the plate 11 is largely overcome by subjecting the milk to the impact against the plate 12.

Obviously two or more diaphragms 2 may be employed in the cylinder 1, if desired, said plates being suitably separated and pressure-gages being preferably located between each pair of plates. In this way the pressure to which the milk is subjected may be reduced by degrees and finally discharged through the plates 11 at a low pressure.

While my invention has been described in connection with the treatment of milk, it may obviously be used for fixing other compound liquids or emulsions.

My invention in its broader aspects is not limited to the precise steps or series of steps herein described, as the details of carrying out the process may be greatly varied without departing from the main principles of my invention and without sacrificing its chief advantages.

Having thus described my invention, what I claim as new, and desire to secure by Letters Patent, is—

1. In a process of preserving compound liquids, the steps of subjecting the liquid to a pressure of about two hundred atmospheres, and passing it through minute openings with slight reduction in the pressure on the discharge side.

2. In a process of preserving compound liquids, the steps of subjecting the liquid to a pressure of about two hundred atmospheres, then passing it through successive sets of minute openings and slightly reducing the pressure on the discharge side of at least one set of openings.

3. In a process of preserving compound liquids, the steps of subjecting the liquid to a pressure of about two hundred atmospheres, then passing it through openings having a diameter of about one-tenth of a millimeter with slight reduction in the pressure on the discharge side and then again passing it through minute openings.

4. In a process of preserving milk, the step of subjecting the milk to impact under a velocity of about two hundred feet per second.

5. In a process of preserving compound liquids, the steps of passing the liquid through minute openings under a pressure of about two hundred atmospheres, and directing the streams issuing from the openings against an impact-surface.

6. In a process of preserving compound liquids, the steps of subjecting the liquid to a pressure of about two hundred atmospheres, then passing it through minute openings with slight reduction in the pressure on the discharge side, and finally subjecting the liquid to impact under a velocity of about two hundred feet per second.

In testimony whereof I have signed my name to this specification in the presence of two subscribing witnesses.

DANIEL DUPONT FRANKLIN.

Witnesses:
 E. CAMBRELENG,
 J. H. FREEMAN.